3,431,242
PROCESS FOR PRODUCING FIBRIDS BY VIOLENT AGITATION

Paul F. Waters, Silver Spring, and Leo J. Muraro, Baltimore, Md., assignors to W. R. Grace & Co., New York, N.Y., a corporation of Connecticut
No Drawing. Filed Feb. 27, 1967, Ser. No. 619,045
U.S. Cl. 260—67  7 Claims
Int. Cl. C08g 53/03; C08f 47/03

---

ABSTRACT OF THE DISCLOSURE

A process for producing a nonrigid wholly synthetic polymeric particle capable of forming paper-like structures by dissolving the polymer in a solvent, and then adding this solution to a nonsolvent for the polymer while violently agitating the mixture. A thermodynamic buffering agent is added to the solvent before dissolving the polymer.

---

This invention relates to a novel process. More specifically it relates to an improvement in the process for the production of a particle of a soluble synthetic polymer referred to hereinafter as a "fibrid" which is particularly useful in production of sheet like structures.

In summary this invention provides an improvement in the process for the production of fibrids by adding a solution of a wholly synthetic polymer to a precipitant for that polymer under shear conditions; the improvement comprising adding a thermodynamic buffering agent to the solvent for the polymer before dissolving the polymer, the agent chosen as described hereinafter.

The term "fibrid" is one well-known in the art and designates a nonrigid wholly synthetic polymeric particle capable of forming paper-like structures on a paper making machine. Fibrids are specifically described and disclosed in, for example, U.S. Patents 2,988,782 and 2,999,788.

These patents provide a process for producing fibrids by dissolving a polymer in a solvent and then adding this solution to a nonsolvent for the polymer under "shear" conditions defined in the patents. The various conditions and reactants are thoroughly discussed in these patents, all of which is incorporated herein by reference.

One major term defined in the aforementioned patents is "precipitation number," which provides means to predict the size of the fibrid aggregates as a function of rate of shear.

However, we have found that the formation of fibrids and extent of fibrid surface generated is dependent upon the addition of what we call a "thermodynamic buffering chemical." This term as used herein defines a chemical having surface-active properties and similar structure to make it compatible with the polymer to be treated. Without the use of our buffering chemical, fibrids cannot be formed using certain polymers, and in the case of other polymers, fibrids are formed having very poor quality, such as coarse fibrous particles that will not bind into webs, or gelatinous lump formations.

It is difficult to give specific preferred thermodynamic buffering agents since each one must be chosen to fit each specific polymer. Two major requirements must be met, however:

(1) It must have surface active properties.
(2) It must have similar structure to the polymer.

By the term "surface-active properties" is meant properties well-known in the art, usually found in surface-active agents. These include, but are not limited to, ability to wet surfaces readily, remove dirt, penetrate porous material, disperse solid particles, emulsify oil and grease, and produce foam when shaken or stirred in dilute aqueous solution. Surface-active agents owe these properties to an oil-soluble portion and a water-soluble portion on the same molecule. Furthermore, surface-active agents can be characterized as cationic, anionic, or nonionic.

It is clear that a compound having surface-active properties can be easily obtained. However, not all surfactants are operable in our invention, since the chosen agent must have a very similar structure to the chosen polymer. This concept is best illustrated by the example using the polymer: polyoxymethylene. This polymer may be schematically represented as

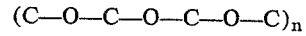

or a chain $n$ units long, $n$ being an integer, of alternating carbon and oxygen. So far, we have found only one type of surfactant is operable to form polyoxymethylene fibrids, that is, a polyglycoldiamine such as $C_{10}H_{24}N_2O_3$, having polyether linkages similar to the polyoxymethylene. The polyglycol diamine we have found particularly suitable has a probable structure of

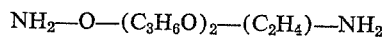

and may be purchased commercially.

It is also true that a thermodynamic buffering agent may be used with more than one type of polymer. For example, the polyglycoldiamine supra is also suitable with polyethylene, polypropylene and other similar poly (1-olefins).

Other examples of suitable buffering agents and polymer pairs are: long chain amide-containing surfactant and "Polyamide-T," an amine-terephthalic acid polymeric condensate; and polyglycoldiamine with polystyrene.

This invention is further described by the following examples.

EXAMPLE 1

Polyethylene fibrids were produced by dissolving a high density polyethylene (having a density of 0.96 and a melt index measured by ASTMD 1238–62T condition E of 0.2) in xylene to make up an 8% by weight solution. To this solution was added 0.75% by weight polyglycol diamine. This solution was poured into a water filled Waring Blendor at top speed for 45 seconds. Excellent fibrids were collected.

EXAMPLE 2

A crystalline polypropylene was processed into fibrids using the general process of Example 1, except that 0.79% by weight of polyglycol diamine was added to the 3% by weight polypropylene in xylene solution. A waterleaf made from the fibrids had excellent properties.

EXAMPLE 3

Polyoxymethylene fibrids were made by dissolving the polymer in dimethylsulfoxide to make an 11% by weight solution, containing 2.8% polyglycol diamine. The solution was poured into glycerol held at 45° C. in a Waring Blendor.

EXAMPLE 4

Polyamide-T fibrids were made by dissolving the polymer in benzyl alcohol to make a 6% by weight solution. This solution contained 0.2% of Witcomide, a commercial long-chain amide-containing surfactant. The solution was poured into water at room temperature and stirred in a Waring Blendor.

EXAMPLE 5

This example shows the buffering chemical on the production fibrids. Polyoxymethylene was dissolved in dimethyl sulfoxide to form a 10% by weight solution. This solution was poured into glycerol at 140° C., in a Waring Blendor and stirred. The solid observed was a coarse agglomerated lump-like precipitant.

EXAMPLES 6, 7 AND 8

Polyethylene, polypropylene and polyamide-T were all dissolved in the same solvents as before without adding the surfactant agents. Again, poor results were obtained.

EXAMPLE 9

This example tested the effect of the order of addition of the surface active material to the polymer solvent.

An 11% by weight solution of polyoxymethylene in dimethyl sulfoxide was prepared. At this point 0.25 gram of polyglycol diamine were added to the dissolved polymer solution. The polymer solution containing the buffer reagent was then added to the glycerin in the Waring Blendor. The result was observed that long stringy globs of polymer were produced, the structures were very coarse and did not have desired physical appearance. The results of this experiment indicate that the order of addition of the surface active agent to the solution of polymer is critical; that if the polymer is dissolved in solvent before the surface active agent is added, most of the dissolved polymer molecules do not react with the surface active agent and those are not easily agitated into fibrids.

Although we do not wish to be bound by theory, it is evident that the dissolved polymer must be protected from the shock of pouring the solution into the precipitant. When no protection is afforded against this shock precipitation, a ball or mass of polymer is formed instead of the desired fibrids. If a desirable thermodynamic buffering agent is chosen and added to the solvent *before the polymer is dissolved*, this agent protects or buffers each polymer molecule in solution and allows a good thermodynamic situation to prevail long enough for molecules to align. These aligned molecules in the solution upon being shocked into the solid state result in the desired fibrids.

Thus, it is clear that the buffering agent must be a substance compatible with the polymer, the solvent and the non-solvent. It possibly functions by being sorbed on the polymer surface or possibly protects the polymer by micelle or complex formation.

EXAMPLE 10

The fibrids formed in Examples 1, 2, 3 and 4 were formed into water leaves by depositing the washed fibrids on 8 x 8 inch 100 mesh screen. These sheets all had good tensile strength and demonstrated the paper forming capacity of the particles of each example.

Preferred embodiments of our invention include the range of the *buffer surfactant* agent between 0.1 and 5 weight percent based on the solvent for the polymer, and operably an effective amount usually between above 0 and 10 weight percent. Threshold limits were not established in all cases being strongly dependent on the chosen polymer and agent. The polymer solution should preferably contain 5 and 20 weight percent of polymer in the solvent and below about 25 weight percent as an operable range.

The temperature at which the reaction is run is not critical, except that it might be necessary to heat the solvent to completely dissolve the polymer. The reaction can be run at temperatures below the vaporization point of the various liquids involved. Usually this range will be below about 200° C. and above room temperature. We prefer to work in the range of 25° C. to 150° C.

Other equipment than a Waring Blendor can be used to produce the violent agitation necessary to produce the fibrids according to our invention process. The choice of equipment is wide and various types include shearing devices which use counter-rotating discs on a single rotating disc and a stationary disc.

The order of addition of the buffering agent to the polymer solution is critical as stated before. It is preferable to add the agent to the agent to the solvent before dissolving the polymer in the solvent.

The choice of thermodynamic buffering agents, as stated before, is limited to those chemicals which show an infinity for solvent, polymer and precipitant as well as preferably exhibiting some surface activity. Generally, a suitable buffering agent must be chosen individually.

In choosing the polymer solvents it will be obvious a large variety of organic liquids are suitable for preparing the polymer solutions. A particular solvent chosen will depend upon toxicity, cost, the polymer being used and the like. The solvents which have been found most widely useful are polar solvents such as N,N-dimethylformamide, m-cresol, formic acid, and dimethyl sulfoxide. Hydrocarbon polymers are frequently soluble in solvents such as xylene, acetone, chloroform and mixtures of chloroform with alcohol. Another useful group of liquids include those which dissolve the polymer at high temperatures which are non-solvents at temperatures in the neighborhood of room temperature. Thus it is possible to use these liquids as both solvents and precipitants by controlling the temperature, as for example ethylene glycol used with polyamides, tetramethylene sulfone used with polyethylene terephthalate, and xylene used with polyethylene.

A liquid is suitable as a precipitant if it dissolves no more than about 3% by weight of the polymer. It is preferable but not absolutely essential that the precipitant be miscible with the polymer solvent in the proportions used. Some degree of miscibility is of course essential. Suitable precipitants are water, glycerol, ethylene glycol, ether, carbontetrachloride, acetone-hexene mixtures, triethanol amine etc. Water miscible precipitants are preferred and aqueous organic mixtures, particularly water glycerol mixtures are an important group of precipitants. Glycerol alone or aqueous solutions containing small amounts (i.e., up to about 20%) of water have been found to be the best precipitants for the condensation elastomers, although ethylene glycol has been found to give substantially equivalent results.

Mixtures of solvents and precipitants such as dilute aqueous solutions of the solvent have also been found to be useful. If fibrids with improved drying characteristics and better affinity for hydropholic materials are desired, it is preferable to use a non-polar hydropholic medium as a precipitant.

Precipitants are operable over a wide range of viscosities, e.g., from about 1 to about 1500 centipoises. The viscosity of the precipitating medium may be controlled over a wide range by changing the temperature or by the use of additives including thickeners. Relatively viscous precipitating media are preferred. The effectiveness of this shearing action provided by the stirrer is enhanced by decreasing the viscosity of the solution and/or increasing the viscosity of the percipitant.

Either the precipitant, or the solution, or both may contain additives for modifying the types of slurries and/or the nature of the sheet products obtained. Thus precipitant and/or the solution may contain fibrids from the same or different polymers. Precipitants and/or the solution may also contain in place of or in addition to the fibrids claimed herein, synthetic and/or natural staple fibers such as those from nylon or cellulose, glass fibers, or asbestos, etc. The precipitan tand/or the solution may also contain dyes, antistatic agents, fillers, pigments, antioxidant, etc.

The fibrids produced using the process of my invention are obviously useful in making papers particularly for applications such as maps, or packaging materials used in humid climates. Specific combinations are particularly well suited for special applications, and many applications, industrial and otherwise will be obvious to one skilled in the art. Although the preparation of paper-like structures has been mentioned it is clear that by proper blending with other fibers a sheet which resembles leather may be obtained on the paper-making machine. It is also evident that many interesting blends can be made by mixing different polymer fibrids.

Many equivalent modifications will be apparent to those skilled in the art without a departure from the inventive concept.

What is claimed is:

1. A process for producing a particle of a soluble synthetic polymer which comprises adding to a solvent for said polymer a surface active buffering agent, dissolving said polymer in said solvent, adding this solution to a nonsolvent for the polymer under conditions giving a high rate of shear, collecting the precipitated particles of polymer formed in the nonsolvent; the buffering agent and the synthetic polymer being a pair selected from the group consisting of (a) polyglycoldiamine as the buffering agent and a synthetic polymer of the group consisting of polyethylene, polypropylene, polyoxymethylene, and polystyrene; and (b) a long chain amide as the buffering agent with a polyamide as the synthetic polymer.

2. The process described in claim 1 in which the surface active buffering agent is employed in the solvent up to about 10 weight percent.

3. The process according to claim 1 in which the polymer dissolved in the solvent to provide about a 5 to 25 weight percent solution.

4. The process according to claim 1 in which the solvent is chosen from the group consisting of xylene, dimethyl sulfoxide, and benzyl alcohol.

5. The process according to claim 1 in which the precipitating medium is chosen from the group consisting of water and glycerol.

6. The process according to claim 1 in which the synthetic polymer is a polyamide and the buffering agent is a long chain amide.

7. The process according to claim 1 in which the reaction is conducted in a Waring Blendor.

References Cited

UNITED STATES PATENTS 3,244,687   4/1966   Spindler.

FOREIGN PATENTS 953,237   3/1964   Great Britain.

WILLIAM H. SHORT, *Primary Examiner.*

L. M. PHYNES, *Assistant Examiner.*

U.S. Cl. X.R.

260—78, 93.5, 94.9, 96